J. H. BELTZ.
COUPLING DEVICE.
APPLICATION FILED JAN. 13, 1910.

962,733.

Patented June 28, 1910.

WITNESSES:
O. E. Carlsen.
E. C. Carlsen.

INVENTOR:
John H. Beltz
BY his ATTORNEY:
A. M. Carlsen.

UNITED STATES PATENT OFFICE.

JOHN H. BELTZ, OF ST. PAUL, MINNESOTA, ASSIGNOR OF ONE-HALF TO ADOLPH MOHR, OF ST. PAUL, MINNESOTA.

COUPLING DEVICE.

962,733.  Specification of Letters Patent.  Patented June 28, 1910.

Application filed January 13, 1910. Serial No. 537,825.

*To all whom it may concern:*

Be it known that I, JOHN H. BELTZ, a citizen of the United States, residing at St. Paul, in the county of Ramsey and State of Minnesota, have invented a new and useful Coupling Device, of which the following is a specification.

My invention relates to coupling means for draft appliances of various kinds and is especially adapted for coupling together the parts by which a vehicle or any of its parts are drawn, including car couplings, vehicle couplings clevises &c.; and the object of the invention is to provide in such appliances a coupling pin which when given about half a turn will automatically lock itself against accidental escape from its place and when given another half turn will automatically unlock itself and be ready for removal.

Figure 1:
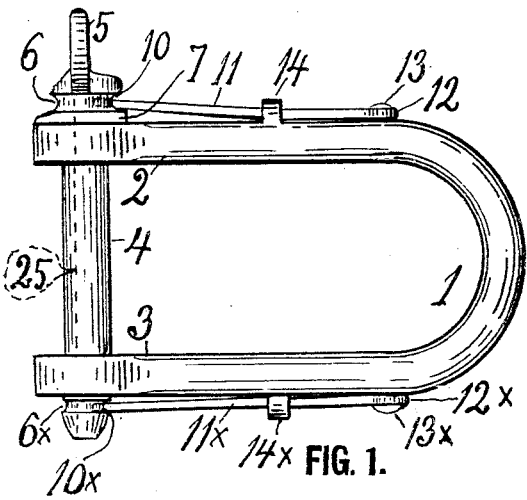
Figures 2, 3:
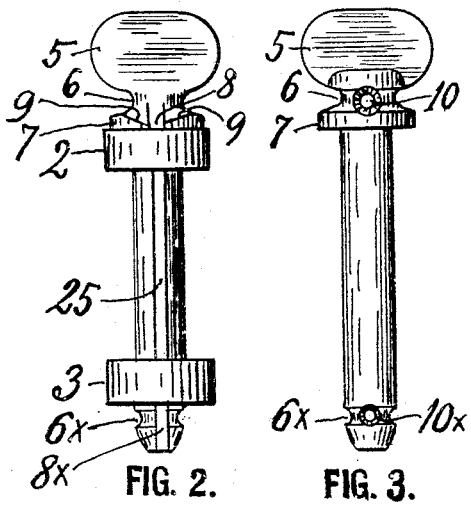
Figure 4:
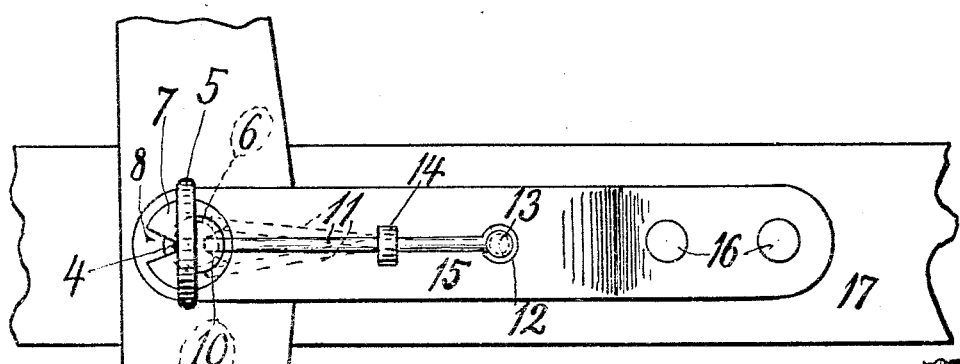
Figure 5:
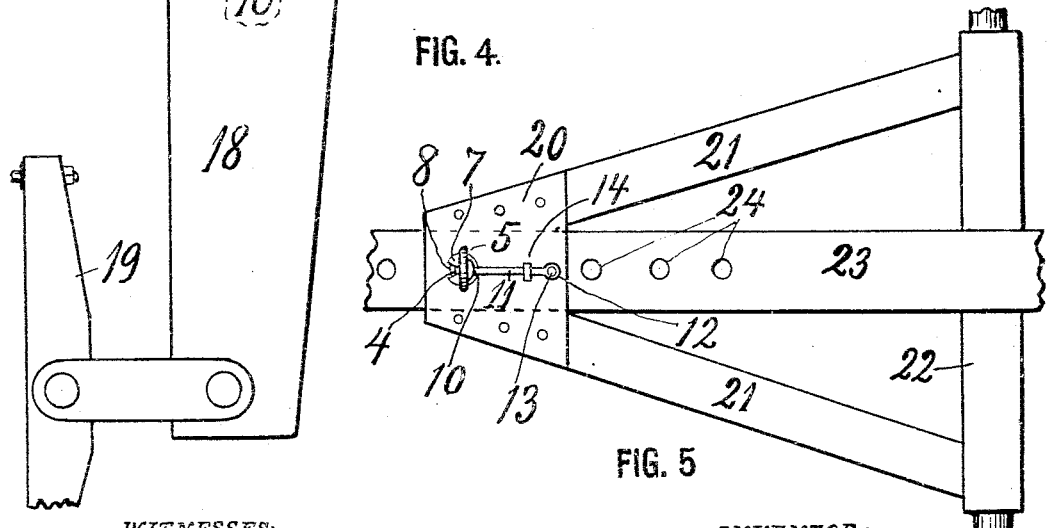

In the accompanying drawing,—Figure 1 is a side view of a draft clevis provided with my safety draft pin, or coupling device as I may term the invention. Fig. 2 is a left hand end view of Fig. 1. Fig. 3 is a detail view of the rear side of the pin in Fig. 2. Fig. 4 is a top view of a vehicle pole or tongue with parts of a swingle-tree and whiffle-tree showing how my improved pin may be applied through the front end of the hammer strap of such draft gears. Fig. 5 is a top view of a reach, reach socket, hounds and rear axle of a wagon, with my novel draft pin applied to the reach socket for holding the reach adjustably therein.

Referring to the drawing by reference numerals, 1 designates a draft clevis or any clevis used for connecting two parts safely but separably together. Through common round holes in the arms 2 and 3 of the clevis is inserted a coupling pin 4, the head end of which is provided with a thumb piece 5 and therebelow with an annular groove 6, below which is a collar 7 having a radial notch 8, (see Figs. 2 and 4) near which the collar is beveled as at 9 in Fig. 2. At the opposite side from said notch the pin is provided with a flared cavity 10, in which is normally engaged one end of a spring arm 11, whose other end is formed with an eye 12 that is secured at 13, preferably by dropping it upon a stud cast on the clevis and then upsetting the end of the stud with a hammer or a die. The spring arm is held in alinement with the arm of the clevis by an apertured lug 14 formed on the latter.

In Fig. 4 is shown how the elements 11, 12, 13 and 14 just described may be provided upon a hammer strap 15 secured by bolts 16 to a pole or tongue 17 and the pin 4 passed downward through the front end of said strap and through a swingle-tree 18, to which whiffle-trees like 19 may be attached. 18 may also represent any form of evener bar or draft equalizing bar.

In Fig. 5 the elements 11, 12, 13 and 14 are shown as applied to the upper plate of a reach socket 20, secured by hounds 21 to the rear axle 22 of a vehicle, and having a reach 23 slidably mounted in it and provided with apertures 24, either of which may be engaged by the pin 4, which is passed through it and through the upper and lower plates of the socket.

In Figs. 1, 2 and 3 is shown that the lower end of the pin may have an annular groove $6^x$ with a notch $8^x$, and opposite therefrom a flared cavity $10^x$ in which normally engages one end of a spring arm $11^x$, which is inserted in a lug $14^x$ and has its other end or eye $12^x$ secured on a stud $13^x$ on the lower arm of the clevis. The spring arm may thus be applied to either the head end or point end of the pin, and where extra safety is required both ends of the pin may each be engaged by a spring arm; but in the latter case the notches 8 and $8^x$ are connected by a longitudinal groove 25 in one side of the pin (see Fig. 2) as a clearing for the end of the upper spring arm 11 in removing and inserting the pin.

To operate the device the pin is simply inserted into the parts to be coupled while its notch, or notches, are turned toward the spring arm, or arms, and by giving the pin half a turn in either direction the spring arm or arms, will yield, as shown in dotted lines in Fig. 4, and then spring into straight position and engagement with the flared cavity or cavities of the pin, and by such engagement fully prevent accidental withdrawal of the pin or even the turning movement of the pin necessary before it can be removed. To remove the pin the operator takes hold of the flat head of the pin and by giving it half a turn bends the spring arm or arms out of the cavity or cavities of the pin and allows the arm or arms to spring into the notch or notches at the opposite side of the pin, whereupon the pin is extracted.

What I claim is:

1. In a coupling device the combination with a primary member having a hole for a coupling pin adapted to engage in a secondary member and a coupling pin insertible in said hole, of a spring arm mounted on the primary member and normally directed into the path of some part of the pin, said pin having at one side a flared cavity for the spring arm to enter into and at the opposite side a notch for the spring arm to pass through during the insertion and removal of the pin.

2. In a coupling device the combination with a primary member having a hole for a coupling pin adapted to engage in a secondary member and a coupling pin insertible in said hole, of a spring arm mounted on the primary member and normally directed into the path of some part of the pin, said pin having at one side a flared cavity for the spring arm to enter into and at the opposite side a notch for the spring arm to pass through during the insertion and removal of the pin; and an annular groove about the pin from said cavity to said notch.

3. In a coupling device the combination with a primary member having a hole for a coupling pin adapted to engage in a secondary member and a coupling pin insertible in said hole, of two spring arms mounted on the primary member and normally directed partly into the path of some part of the pin, one near each end of the pin, said pin having at one side two cavities adapted for engagement with the ends of the two spring arms when the pin is inserted, and in the side diametrically opposite from said cavities a groove along the pin as a clearing for the ends of the spring arms during the insertion and removal of the pin.

In testimony whereof I affix my signature, in presence of two witnesses.

JOHN H. BELTZ.

Witnesses:
A. M. Carlsen,
E. C. Carlsen.